United States Patent
Reitz et al.

(10) Patent No.: US 6,526,939 B2
(45) Date of Patent: Mar. 4, 2003

(54) DIESEL ENGINE EMISSIONS REDUCTION BY MULTIPLE INJECTIONS HAVING INCREASING PRESSURE

(75) Inventors: Rolf D. Reitz, Madison, WI (US); Matthew P. Thiel, Madison, WI (US)

(73) Assignee: Wisconsin Alumni Research Foundation, Madison, WI (US)

(*) Notice: Subject to any disclaimer, the term of this patent is extended or adjusted under 35 U.S.C. 154(b) by 68 days.

(21) Appl. No.: 09/844,891

(22) Filed: Apr. 27, 2001

(65) Prior Publication Data

US 2002/0157637 A1 Oct. 31, 2002

(51) Int. Cl.$^7$ .................................................. F02B 3/00

(52) U.S. Cl. ........................................ 123/299; 123/295

(58) Field of Search ................................ 123/299, 295, 123/300, 305, 430, 506

(56) References Cited

U.S. PATENT DOCUMENTS

| | | | |
|---|---|---|---|
| 5,345,916 A | | 9/1994 | Amann et al. |
| 5,392,745 A | | 2/1995 | Beck |
| 5,425,341 A | | 6/1995 | Connolly et al. |
| 5,601,068 A | * | 2/1997 | Nozaki ................ 123/568.11 |
| 5,771,865 A | * | 6/1998 | Ishida ........................ 123/300 |
| 5,801,308 A | * | 9/1998 | Hara ............................ 73/223 |
| 6,112,721 A | | 9/2000 | Kouketsu et al. |
| 6,378,487 B1 | * | 4/2002 | Zukouski et al. ........... 123/295 |
| 2002/0026922 A1 | | 3/2002 | Betz et al. |

FOREIGN PATENT DOCUMENTS

| | | |
|---|---|---|
| EP | 1 077 321 A | 2/2001 |
| JP | 11343912 A | 12/1999 |

OTHER PUBLICATIONS

PCT (Patent Cooperation Treaty) International Search Report issued by European Patent Office for corresponding World Patent Application PCT/US02/11197, dated Aug. 13, 2002.

Tow, et al., Reducing Particulate and NO$_x$ Emissions by Using Multiple Injections in a Heavy Duty D.I. Diesel Engine, (1994) SAE Technical Paper Series 940897, Abstract, pp. 201–215.

Pierpoint, et al., Reducing Particulate and NO$_x$ Emissions by Using Multiple Injections and EGR in a D.I. Diesel, (1995) SAE Technical Paper Series 950217, Abstract, pp. 1–13.

Tow, T., Pierpoint, A. and Reitz, R.D. (1994) "Reducing Particulates and NOx Emissions by Using Multiple Injections in a Heavy Duty D.I. Diesel Engine," SAE Paper 940897, *SAE Transactions*, vol. 103, Section 3, *Journal of Engines*, pp. 1403–1417.

Montgomery, D.T. and Reitz, R.D. (1996) "Six–mode Cycle Evaluation of the Effect of EGR and Multiple Injections on Particulate and Nox Emissions from a D.I. Diesel Engine," SAE Paper 960316, *SAE Transactions*, vol. 105, Section 3, *Journal of Engines*, pp. 356–373.

* cited by examiner

Primary Examiner—Henry C. Yuen
Assistant Examiner—Mahmoud Gimie
(74) Attorney, Agent, or Firm—Craig A. Fieschko, Esq.; DeWitt Ross & Stevens S.C.

(57) ABSTRACT

Multiple fuel charges are injected into a diesel engine combustion chamber during a combustion cycle, and each charge after the first has successively greater injection pressure (a higher injection rate) than the prior charge. This injection scheme results in reduced emissions, particularly particulate emissions, and can be implemented by modifying existing injection system hardware. Further enhancements in emissions reduction and engine performance can be obtained by using known measures in conjunction with the invention, such as Exhaust Gas Recirculation (EGR).

20 Claims, 2 Drawing Sheets

DIESEL ENGINE EMISSIONS REDUCTION BY MULTIPLE INJECTIONS HAVING INCREASING PRESSURE

STATEMENT REGARDING FEDERALLY SPONSORED RESEARCH

This invention was made with United States government support awarded by the following agencies: Department of Energy, Grant No. DOE DE-FG04-2000AL66549 (DOE Docket No. S-96,563). The United States has certain rights in this invention.

FIELD OF THE INVENTION

This disclosure concerns an invention relating generally to methods and apparata for reducing emissions from internal combustion engines, and more specifically to methods and apparata for reducing particulate and $NO_x$ emissions from diesel engines.

BACKGROUND OF THE INVENTION

Common pollutants arising from the use of internal combustion engines are nitrogen oxides (commonly denoted $NO_x$ and particulates (also known simply as"soot"). $NO_x$ is generally associated with high-temperature engine conditions, and may be reduced by use of measures such as exhaust gas recirculation (EGR), wherein the engine intake air is diluted with relatively inert exhaust gas (generally after cooling the exhaust gas). This reduces the oxygen in the flame front and obtains a reduction in maximum combustion temperature, thereby deterring $NO_x$ formation. Particulates include a variety of matter such as elemental carbon, heavy hydrocarbons, hydrated sulfuric acid, and other large molecules, and are generally associated with non-optimal combustion. Particulates can be reduced by increasing combustion and/or exhaust temperatures, or by providing more oxygen to promote oxidation of the soot particles. Unfortunately, measures which reduce $NO_x$ tend to increase particulate emissions, and measures which reduce particulates tend to increase $NO_x$ emissions, resulting in what is often termed the "soot-$NO_x$ tradeoff".

At the time of this writing, the diesel engine industry is facing stringent emissions legislation in the United States, and is struggling to find methods to meet government-imposed $NO_x$ and soot targets for the years 2002–2004 and even more strict standards for 2008. One measure under consideration is use of exhaust after-treatment (e.g., particulate traps) for soot emissions control in both heavy-duty truck and automotive diesel engines. However, in order to meet mandated durability standards (e.g., 50,000 to 100,000 miles), the soot trapped must be periodically re-burned. This requires considerable expense and complexity, since typically additional fuel must be mixed and ignited in the exhaust stream in order to burn off the accumulated particulate deposits.

Apart from studies directed to after-treatment, there has also been intense interest in the more fundamental issue of how to reduce $NO_x$ and particulates generation from the combustion process. Studies in this area relate to shaping combustion chambers, timing the fuel injection, modifying the mode of injection (e.g, modifying the injection spray pattern), or tailoring the injection rate during injection so as to meet desired emissions standards. As an example of the use of tailored injection rate, U.S. Pat. No. 5,345,916 to Amman, entitled "Controlled Fuel Injection Rate for Optimizing Diesel Engine Operation," discusses how injection curves (i.e., variation in injection rates over time) can be modified depending on engine speed/load to optimize engine performance. Examples of injection curves wherein the injection rate decreases over time are illustrated (FIGS. 5B and 5D of Amman). Others have taken an opposite approach and proposed injection curves with increasing injection rates. Still others have proposed injection curves which are considerably more complex than simple ascending or descending curves, and which may increase during some period of charge injection and decrease over others; see, e.g., U.S. Pat. No. 5,425,341 to Connolly et al., wherein the shape of the injection curve varies in complexity depending on speed/load conditions.

Multiple injection, also called split injection, pilot injection, and post injection, has also been a proposed method for $NO_x$ and particulate emissions reduction in diesel engines (see, e.g., Tow, T., Pierpont, A. and Reitz, R. D. "Reducing Particulates and $NO_x$ Emissions by Using Multiple Injections in a Heavy Duty 0.1. Diesel Engine," SAE Paper 940897, SAE Transactions, Vol. 103, Section 3, Journal of Engines, pp. 1403–1417, 1994). A multiple injection engine varies from the standard "single injection" engine in that the injection of a single fuel charge during the combustion cycle is replaced by injection of several fuel charges spaced over time, with less fuel being used per injection so that the total amount of fuel finally injected per cycle is comparable to that used in single injection. By spacing fuel injection into several discrete spaced charges, burning and combustion temperature are more evenly maintained and combustion temperature is lower, which helps decrease emissions. While multiple injection is not in common use at the time of this writing, engines using the multiple injection concept are now in production or under development in Europe, Japan and the United States.

While multiple injection will assist the diesel engine industry in meeting emissions goals, it unfortunately does not appear to be a complete solution: it does not by itself decrease emissions to the minimum levels desired. There is thus a significant need for methods and apparata which assist in diesel engine emissions reduction.

SUMMARY OF THE INVENTION

The invention involves methods and apparata which are intended to at least partially solve the aforementioned problems. To give the reader a basic understanding of some of the advantageous features of the invention, following is a brief summary of preferred versions of the methods and apparata. As this is merely a summary, it should be understood that more details regarding the preferred versions may be found in the Detailed Description set forth elsewhere in this document. The claims set forth at the end of this document then define the various versions of the invention in which exclusive rights are secured.

The invention relates to methods of, and apparata for, diesel engine fuel injection. A first fuel charge is injected into a diesel engine combustion chamber during a combustion cycle. Afterward, one or more subsequent fuel charges are injected at a higher injection pressure (and thus a higher injection rate) than the first fuel charge. Where more than one fuel charge is injected after the first fuel charge, each will have a higher injection pressure (and thus a higher injection rate) than the prior fuel charge so that the second fuel charge has a higher injection pressure/rate than the first charge, the third fuel charge has a higher injection pressure/rate than the second charge, and so forth. It is believed that this methodology will result in reduced soot and $NO_x$ emissions over single charge injection schemes using roughly analogous charge timing and volume (i.e., in injection schemes having a single charge injected over roughly the same timespan as in the multiple injection scheme of the invention, and with the same fuel charge volume). It is also believed that the invention will result in decreased soot emissions over those obtained in comparable multiple charge injection schemes using constant injection pressures between charges. As will be discussed elsewhere in this document, a multiple injection scheme with increasing injection pressures in successive fuel pulses is believed to provide increased combustion chamber mixing and soot oxidation rates. Particulate control is advantageously achieved within the combustion chamber using a straight-forward modification of existing injection system hardware, without the need for cumbersome and expensive particulate traps. Additionally, Exhaust Gas Recirculation (EGR) can be used with the invention to provide for further $NO_x$ reductions. Thus, the invention allows simultaneous and significant reduction of both $NO_x$ and particulates emissions, which are (at the time of this writing) the key emissions of concern for diesel engine environmental standards. The multiple injection scheme may also result in better fuel economy than single injection schemes since the first fuel pulse in a series can be started slightly earlier than where only a single pulse is used, so that the greatest heat from the fuel pulse is released when the piston is optimally timed near top dead center.

Further advantages, features, and objects of the invention will be apparent from the following detailed description of the invention in conjunction with the associated drawings.

DETAILED DESCRIPTION OF PREFERRED EMBODIMENTS OF THE INVENTION

Figure 1:
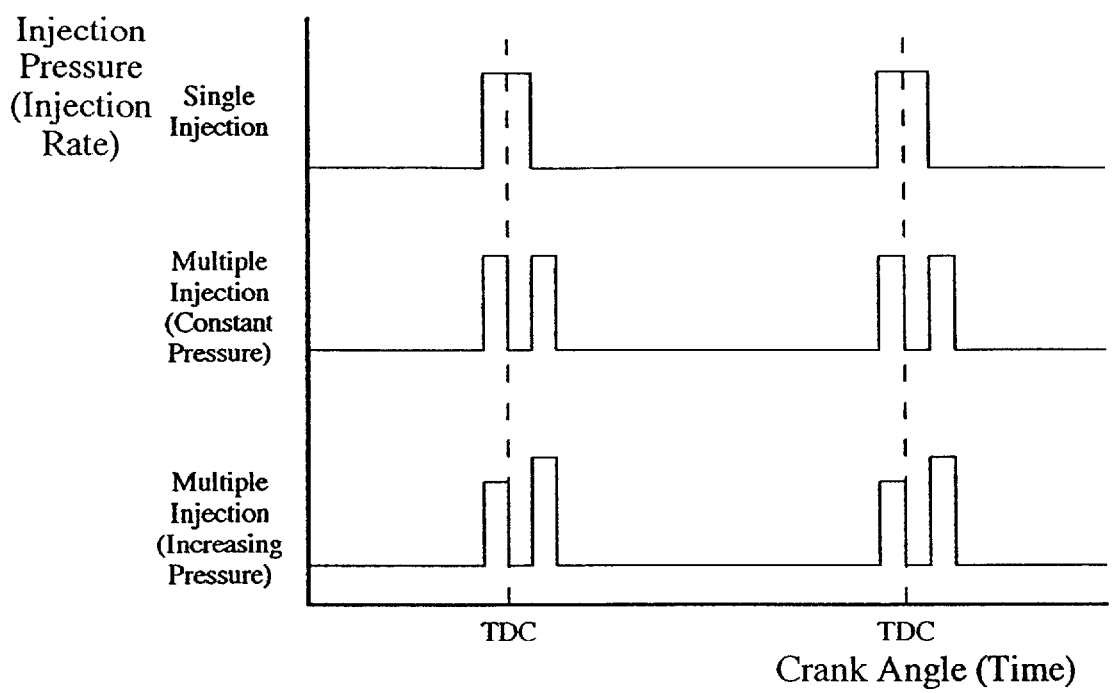
FIG. 1 is a diagram illustrating exemplary injection curves for prior single injection and multiple injection (constant pressure pulse) schemes versus an exemplary injection curve for the present invention, a multiple injection (increasing pressure pulse) scheme.

The invention is best envisioned with reference to FIG. 1, wherein an injection curve (a plot of injection rate or injection pressure versus crank angle or time) for the invention is shown alongside injection curves for prior single injection and multiple injection schemes. It should be understood that these curves are merely exemplary, and the timing of injections relative to top dead center (TDC), the duration of these injections, the profile shape of each injected charge, and the relative heights (i.e., the relative rates/pressures) for the various injection methods may in practice vary widely. In the "traditional" single injection method, a single fuel charge is injected at or near TDC. Multiple injection, in contrast, utilizes two (or possibly more) injections at or near TDC, with the amount of fuel used in these multiple charges being the same or closely similar to that utilized in the charge of the single charge method. The multiple injection method generally uses a common-rail injection system wherein fuel is pumped to a common rail, which then supplies the engine's injection needles with fuel at a high constant pressure. In contrast, the present invention injects a series of charges wherein successive charges are supplied at higher rates/pressures than preceding charges.

The invention has not yet been tested to determine its effectiveness, but the tests that led to the conception of the invention appear to indicate that the invention will have beneficial results. These tests were performed to study multiple injection methods, which (as previously noted) are known to reduce both soot and $NO_x$ emissions. In these tests, the inventors ran a single-cylinder test engine using dual-pulse injection, i.e., multiple injection wherein a sequence of two fuel charges is injected, at various speeds and loads in an attempt to reproduce the results of prior multiple injection tests. When the exhaust of the test engine was analyzed, and results were plotted as particulates versus $NO_x$, a diagonal line appeared which descended from the high soot/low $NO_x$ region to the low soot/high $NO_x$ region, which reflects the typical soot/$NO_x$ tradeoff. However, the line appeared to reflect much higher soot (and slightly higher $NO_x$) than was found in previous tests using the same apparatus, and supposedly the same testing conditions. Since it appeared that some parameter of the test engine had changed between the prior and later tests, the results of the prior and later tests were analyzed to diagnose what the change might be. When heat release between the tests was compared (i.e., the derivative of cylinder pressure versus crank angle, an indication of the heat released during the engine cycle), it was found that the later tests had significantly lower heat release associated with the second fuel pulse than in the prior tests. It was also found that for similar speed/load conditions on the engine, the earlier and later test results had similar $NO_x$ emissions, but the later tests had higher particulate emissions. Further examination found that the higher particulates and lower heat release on the second pulse were a result of a defect in the fuel injector which caused the second pulse to have lower injection pressure than in the first fuel pulse.

When considering the interaction between the lower pressure in the second pulse, the lower heat release arising therefrom, and the higher particulate emissions from the engine, it appeared that lower second pulse injection pressure resulted in more incomplete combustion than the case where the pressures in the first and second pulses were the same. It is thought that this effect occurs because the second pulse—which occurs as the piston is moving away from TDC, and chamber pressure and temperature are dropping away from optimal combustion conditions—has poor mixing within the combustion chamber. Lower-pressure jets of fuel ejected from the injection needles may be more cohesive and may present larger spray droplets, whereas higher-pressure, higher-velocity jets may be more atomized and may present smaller droplets, and may therefore provide more surface area where combustion may be initiated. As a result, the lower-pressure second pulse might be more prone to incomplete combustion.

It was then hypothesized that since lower second pulse pressure was demonstrated to lead to similar $NO_x$ content but higher particulate content than where constant injection pressure was maintained between pulses, a higher injection pressure for the second pulse should provide lower particulates with similar $NO_x$ content. This situation is more useful than the typical situation, wherein the soot-$NO_x$ tradeoff would give rise to higher $NO_x$ where soot is reduced. It is theorized that lower particulates should result from one or more of several factors. First, by distributing fuel in multiple pulses rather than in a single pulse, one may obtain a more controlled burn rate and decreased emissions as compared to single injection. Second, higher injection pressure will provide more finely structured fuel plumes with better fuel atomization/dispersion and greater surface area, promoting superior mixing and more complete combustion. Third, by injecting a second pulse at high injection pressure, and at a time when the piston is withdrawing from the cylinder (and pressure is dropping), the pressure within the combustion chamber will be reinvigorated and combustion conditions will be promoted.

An increased injection pressure during subsequent pulses is obtainable by appropriately modifying currently available fuel injection systems. Examples are illustrated in FIGS. 2–5 which use standard common rail injectors (CRIs), i.e., valves (generally solenoid-actuated) affixed to the injection nozzle. It should be understood that other types of valves may be used, such as electronic unit injectors (EUIs) wherein a unitized volume of fuel is compressed to high injection pressure within the EUI itself.

Figure 2:
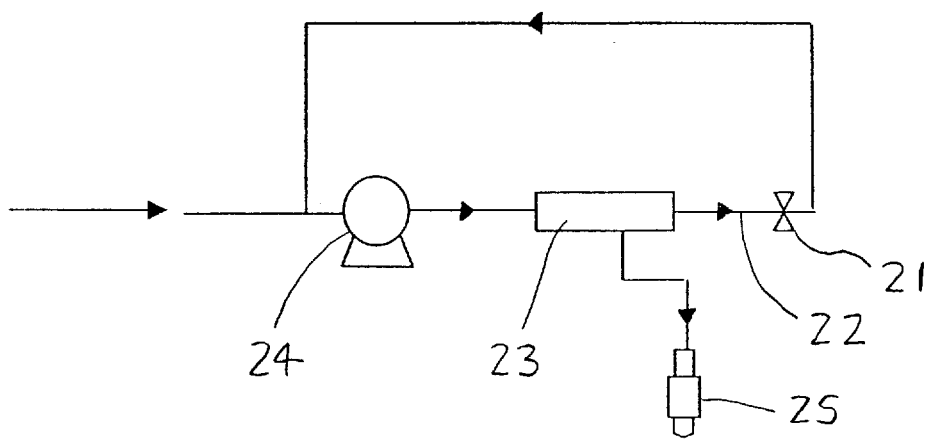
FIGS. 2–5 schematically illustrate apparata for effecting multiple injections with increasing injection pressure in successive injection pulses.

Referring to FIG. 2, a fast-responding pulse-width-modulated (PWM) valve 21 is placed on the outlet 22 of a common rail 23 (supplied by fuel pump 24) to which a CRI 25 is connected, with the injection pressure of the CRI 25 being equal to the pressure in the rail 23. The valve 21 and CRI 25 are actuated at the same frequency. On the initial injection pulse, the valve 21 is modulated at a particular duty cycle effecting some initial injection pressure. On each succeeding injection pulse, the valve 21 is modulated to remain closed for a longer period of time, which has the effect of raising the pressure in the rail 23. Thus, each time the CRI 24 is actuated, its injection pressure/injection rate is increased. Depending on the engine speed and dwell between injections, the response of the valve 21 to a change in duty cycle must generally be on the order of 100 ms. It should be understood that the schematic illustration of FIG. 2 only illustrates a single CRI for the sake of simplicity, but if more than one cylinder is present in an engine, more than one CRI and common rail would be needed (at least one per cylinder).

Figure 3:
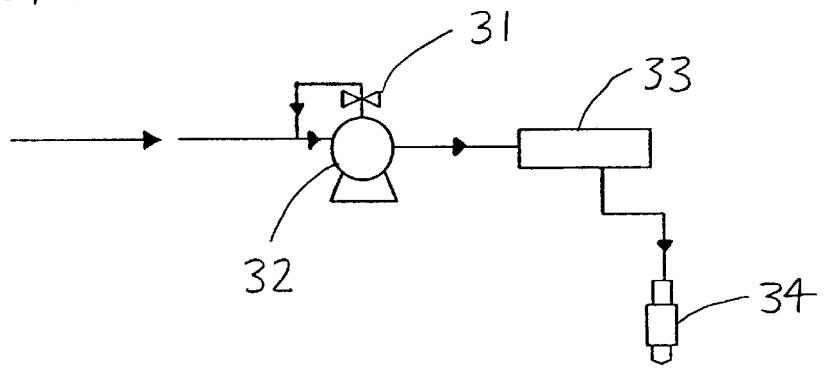

FIG. 3 then illustrates another apparatus for effecting multiple injections with increasing injection pressure in successive injection pulses. A PWM valve 31 is placed on an outlet of a fuel pump 32 which feeds back to its supply. Another outlet of the fuel pump 32 supplies a common rail 33, which in turn supplies a CRI 34. The valve 31 is modulated as in the apparatus of FIG. 2, thereby regulating rail (and injection) pressure upon supply to the common rail 33 versus on return to the common rail 33.

Figure 4:
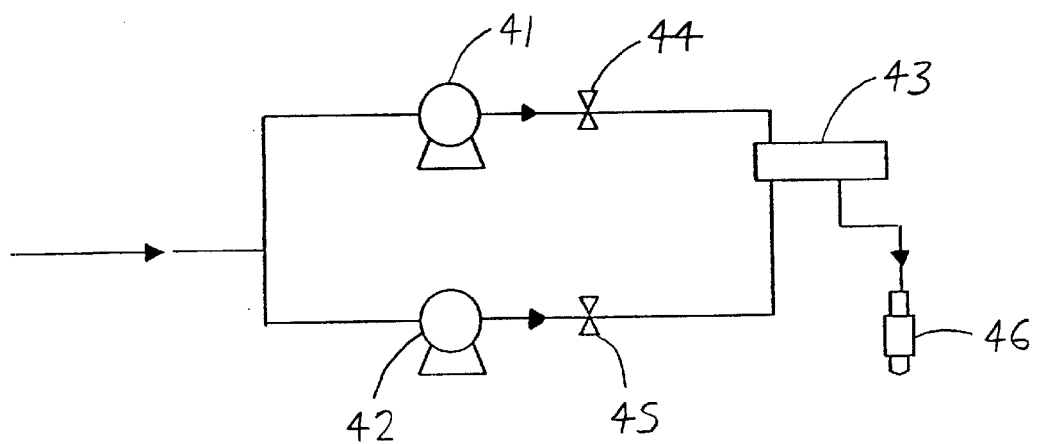

FIG. 4 shows yet another apparatus wherein fuel supply pumps 41 and 42, each regulated to appropriate first and second pulse injection pressures (assuming a dual-pulse multiple injection scheme), are each connected to a common rail 43 via respective fast-switching valves 44 and 45. Prior to the initial pulse injection, the valve 44 between the lower-pressure pump 41 and the common rail 43 is opened. The CRI 46 may then be actuated to deliver a fuel pulse at the first lower pressure. After the first fuel pulse is delivered, the valve 44 between the lower-pressure pump 41 and the common rail 43 is closed, and the valve 45 between the higher-pressure pump 42 and the common rail 43 is opened. The CRI 46 may then be actuated to deliver a fuel pulse at the second higher pressure. The high pressure valve 45 is then closed and low pressure valve 44 is opened, and the pressure in the common rail 43 resets for the first pulse in the next combustion cycle. It should be understood that if more than two pulses are desired for each combustion cycle, additional pumps and valves may be added as needed.

Figure 5:
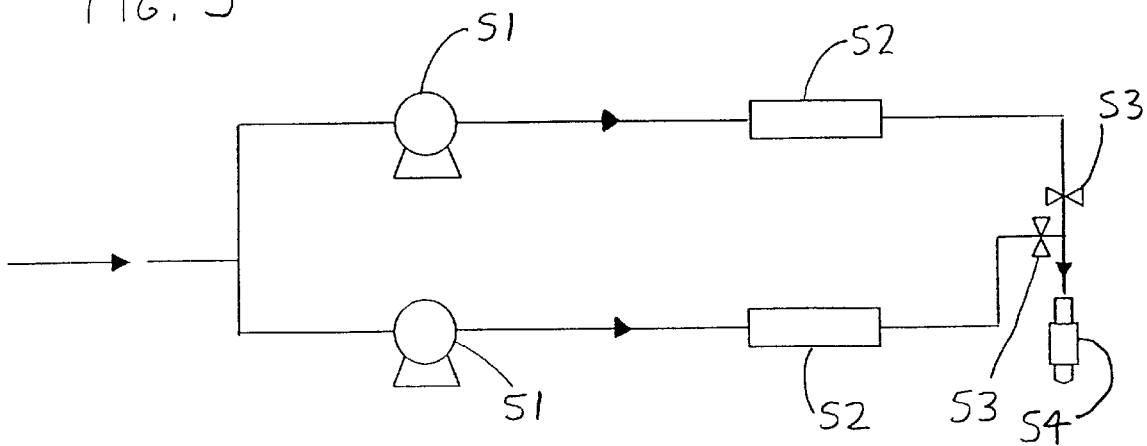

FIG. 5 illustrates an apparatus similar to that of FIG. 4, but here each pump 51 is coupled to its own common rail 52, and a valve 53 is interposed between each rail 52 and the CRI 54. Since each pressure is assigned its own rail, this embodiment minimizes the volume of fuel that must change pressure.

It is understood that the various preferred embodiments are shown and described above to illustrate different possible features of the invention and the varying ways in which these features may be combined. Apart from combining the different features of the above embodiments in varying ways, other modifications are also considered to be within the scope of the invention. Following is an exemplary list of such modifications.

First, while this document generally describes the invention in terms of a dual-pulse multiple injection scheme, it should be understood that the invention may be implemented with more than two fuel pulses being injected. Additionally, the invention might be beneficially implemented in combination with prior single injection or multiple injection schemes; for example, first and second fuel pulses might be injected at the same injection rates, and then subsequent pulses might have successively increasing injection rates.

Second, it is noted that the increasing pressure multiple injection concept may be implemented with fuel charges of equal duration and increasing injection rate in each successive pulse, as illustrated in FIG. 1, or could instead be implemented with fuel charges having different duration and increasing injection rate in each successive pulse. In the former arrangement, the volume of fuel injected in each charge becomes successively greater, since volume is the product of pulse duration and injection rate. In the latter arrangement, volume does not necessarily increase; one may deliver fuel charges which have successively greater injection rates, but the charges may all have the same or even diminishing fuel volume if the pulse duration is diminishing. In some cases, it may be desirable to increase injection rates between the multiple charges to enhance mixing, but simultaneously diminish their fuel volumes. This will inject the charges containing greatest energy first, when the piston is nearest top dead center, so as to provide higher engine efficiency.

Third, numerous other apparata for effecting the multiple injection scheme of the invention are possible apart from those shown in FIGS. 2–5. The apparata illustrated in these Figures merely reflect modifications that may be made to existing systems to adapt them for implementation of the invention, and it is possible to develop other useful modifications of existing systems, or to develop new apparata specifically designed for use with the invention.

Fourth, the invention may be usefully implemented with other known means for reducing emissions or otherwise enhancing engine performance. As an example, prior research has shown that Exhaust Gas Recirculation (EGR) can be useful in reducing $NO_x$ emissions (see, e.g., Montgomery, D. T., and Reitz, R. D., "Six-mode Cycle Evaluation of the Effect of EGR and Multiple Injections on Particulate and $NO_x$ Emissions from a D. I. Diesel Engine, " SAE Paper 960316, SAE Transactions, Vol. 105, Section 3, Journal of Engines, pp. 356–373, 1996).

The invention is not intended to be limited to the preferred embodiments described above, but rather is intended to be limited only by the claims set out below. Thus, the invention encompasses all alternate embodiments that fall literally or equivalently within the scope of these claims.

What is claimed is:

1. A method of diesel engine fuel injection comprising injecting a sequence of at least two fuel charges into an engine cylinder during a diesel combustion cycle, the sequence beginning with an initial fuel charge, wherein:

a. the fuel charge succeeding the initial fuel charge is injected at higher pressure than the initial fuel charge, and b. wherein each successive fuel charge in the sequence contains lower fuel volume than the preceding fuel charge.

2. The method of claim 1 wherein each successive fuel charge injected during the diesel combustion cycle is injected at higher pressure than the preceding fuel charge.

3. The method of claim 1 wherein each successive fuel charge in the sequence has a higher injection rate than the preceding fuel charge.

4. The method of claim 1 further comprising the step of performing exhaust gas recirculation utilizing combustion gases produced from the engine cylinder during the diesel combustion cycle.

5. The method of claim 1:
   wherein the sequence is injected through an injection valve supplied by a rail, and
   wherein the method further comprises the step of increasing the pressure within the rail, thereby increasing the injection pressure between the fuel charges in the sequence.

6. The method of claim 1:
   wherein the sequence is injected through an injection valve supplied by at least two rails, each rail having a different pressure therein, and
   the method further comprises the step of successively supplying the injection valve from each of the rails, thereby varying the injection pressure between the fuel charges in the sequence.

7. The method of claim 1 wherein the initial fuel charge is injected at no more than 20 degrees prior to top dead center.

8. The method of claim 7 wherein the fuel charge succeeding the initial fuel charge is injected at or after top dead center.

9. A method of diesel engine fuel injection comprising:
   a. injecting a first fuel charge into a combustion chamber of a diesel engine at a first flow rate, the first fuel charge being injected at no more than 20 degrees prior to top dead center;
   b. after injection of the first fuel charge has ended, injecting a second fuel charge into the combustion chamber at a second flow rate greater than the first flow rate, the second fuel charge being injected at or after top dead center,
   wherein the first and second fuel charges are both injected into the combustion chamber during the same combustion cycle.

10. The method of claim 9 wherein one or more additional fuel charges distinct from the first and second fuel charges are injected into the combustion chamber during the same combustion cycle.

11. The method of claim 10 wherein each additional fuel charge injected subsequent to the second fuel charge has a flow rate greater than the preceding fuel charge.

12. The method of claim 10:
   wherein all of the fuel charges injected into the combustion chamber during the same combustion cycle define an injection sequence, and
   wherein each fuel charge injected after the first fuel charge in the injection sequence has a flow rate greater than the flow rate of the preceding fuel charge.

13. The method of claim 9 further comprising the step of performing exhaust gas recirculation.

14. The method of claim 9 wherein the second fuel charge contains lower fuel volume than the first fuel charge.

15. A method of diesel engine fuel injection comprising injecting a sequence of at least two fuel charges into an engine cylinder from an injection valve during a diesel combustion cycle, wherein:
   a. the sequence begins with an initial fuel charge;
   b. the fuel charge succeeding the initial fuel charge is injected at higher pressure than the initial fuel charge;
   b. the injection valve is supplied by at least two rails, each rail having a different pressure therein; and
   c. during the sequence, the injection valve is successively supplied from each of the rails, thereby varying the injection pressure between the fuel charges in the sequence.

16. The method of claim 15 wherein each successive fuel charge injected during the diesel combustion cycle is injected at higher pressure than the preceding fuel charge.

17. The method of claim 15 wherein each successive fuel charge injected during the diesel combustion cycle has a higher injection rate than the preceding fuel charge.

18. The method of claim 15 wherein each successive fuel charge in the sequence contains lower fuel volume than the preceding fuel charge.

19. The method of claim 15 further comprising the step of performing exhaust gas recirculation utilizing combustion gases produced from the engine cylinder during the diesel combustion cycle.

20. The method of claim 15 wherein the initial fuel charge is injected no greater than 20 degrees prior to top dead center.

* * * * *